United States Patent [19]
Knoop et al.

[11] Patent Number: 4,835,991
[45] Date of Patent: Jun. 6, 1989

[54] AUTOMATIC WATER LEVEL CONTROL SYSTEM FOR AN AUTOMATIC WASHER

[75] Inventors: Donald E. Knoop, Longview, Tex.; John K. Paustian, Benton Township, Berrien County, Mich.

[73] Assignee: Whirlpool Corporation, Benton Harbor, Mich.

[21] Appl. No.: 137,604

[22] Filed: Dec. 24, 1987

[51] Int. Cl.$^4$ ............... D06F 33/02; D06F 39/08
[52] U.S. Cl. .................... 68/12 R; 68/207
[58] Field of Search ............ 68/12 R, 207; 137/387

[56] References Cited

U.S. PATENT DOCUMENTS

| | | | |
|---|---|---|---|
| 3,030,790 | 4/1962 | Davenport et al. | 68/207 X |
| 3,065,618 | 11/1962 | Cobb et al. | 68/207 X |
| 3,093,841 | 6/1963 | Cobb et al. | 8/158 |
| 3,316,569 | 5/1967 | Brenner et al. | 68/207 X |
| 3,497,884 | 3/1970 | Tichy et al. | 68/207 X |
| 3,498,090 | 3/1970 | Mason | 68/207 |
| 4,503,575 | 3/1985 | Knoop et al. | 68/207 X |
| 4,697,293 | 10/1987 | Knoop | 68/207 X |

FOREIGN PATENT DOCUMENTS

| | | | |
|---|---|---|---|
| 2008794 | 1/1987 | Japan | 68/12 R |
| 2008795 | 1/1987 | Japan | 68/12 R |

*Primary Examiner*—Philip R. Coe
*Attorney, Agent, or Firm*—Hill, Van Santen, Steadman & Simpson

[57] ABSTRACT

An automatic water level control is provided which utilizes a single pneumatic pressure sensor for detecting minimum water level, maximum water level and tub motion during agitation. Relative tub movement change during agitation and filling is used to determine an optimum water level for washing. A horizontal portion of the sensor fills with water during the tub filling process and provides the arrangement for detecting tub motion. A microprocessor stores and compares successive peak pressure signals to determine relative changes in tub motion amplitude.

18 Claims, 2 Drawing Sheets

AUTOMATIC WATER LEVEL CONTROL SYSTEM FOR AN AUTOMATIC WASHER

BACKGROUND OF THE INVENTION

1. Field of the Invention

This invention relates to an automatic liquid control system for a clothes washing machine and more specifically to an automatic liquid level control system.

2. Description of the Prior Art

Various methods have been proposed in the past for controlling the amount of liquid added to a clothes washing machine to provide an optimum amount of wash liquid. U.S. Pat. No. 3,065,618 and a corresponding divisional case U.S. Pat. No. 3,093,841 disclose the use of a torque responsive system which senses the torque transmitted from the agitator to the wash tub by means of a mercury sensor switch in combination with a circuit hold relay and a time delay relay to energize the water control system and to introduce an appropriate amount of liquid into the tub for washing purposes. A separate minimum water level switch 90 and a maximum water level switch 92 are provided, agitation beginning and continuing upon operation of the minimum level switch 90. If sufficient water has not been added at the minimum level, torque will be transmitted from the agitator to the basket through the clothes load closing the mercury sensor switch 70 causing additional water to be added to the tub while agitation continues. The time delay relay 100 will cause water to be added for a preselected length of time which is followed by additional sensing of the mercury switch.

U.S. Pat. No. 3,093,841 describes an improvement in the mechanics of the device but the functioning remains the same.

U.S. Pat. No. 3,316,569 discloses a torque responsive pneumatically operated water level control for an automatic washer in which a steel ball is seated on an outlet from an air bleed line, the ball being unseated in response to excessive movement of the tub caused by a transmission of torque from the agitator to the tub. A pressure switch 44 controls the initial fill and once a minimum water level is achieved agitation commences and continues uninterrupted. Excessive movement of the tub causes the air pressure leading to the pressure switch to be reduced thereby resulting in additional filling of the tub with water until the ball remains seated due to minimal tub movement. A separate maximum water level control switch 57 is provided.

U.S. Pat. No. 3,497,884 discloses an automatic water level control for a washer which utilizes a sensor in the drive train of the washer between the motor and the agitator to detect the torque transmitted between the motor and the agitator. Torque sensors such as mechanical or electrical strain gages are used. A minimum water level switch is used to fill the water to a first level and subsequently agitation commences and continues interrupted, additional filling of water being controlled by the torque sensor.

U.S Pat. No. 3,498,090 discloses a torque responsive water level control which senses the relative motion between the tub and the perforate basket mounted within the tub and uses this relative motion as a control for the water valve.

U.S. Pat. No. 4,503,575 discloses an automatic water level control which is responsive to various parameters selected by the user of the washer in which an incoming water volume is continuously measured by a pressure transducer for an initial time period as the clothes are thoroughly wetted. The incoming water volume is continuously measured by the pressure transducer until a minimum level sensor pressure switch associated with the tub closes signaling that a volume of liquid plus clothes load has been received in the washer. This volume is stored in a microprocessor portion of the washer control. The water fill would continue and the volume continuously measured until the total volume of liquid in the washer reaches a precomputed desired volume finding the desired amount of liquid optimum for washing performance for the selected type of clothes load. This volume is determined by computation from the initial minimum level volume, the fabric type and a stored table of optimum values.

SUMMARY OF THE INVENTION

The present invention provides a double chamber sensor and algorithm in which the optimum water level within the tub for a given load can be determined by sensing the motion of the washer tub. The sensor used is an air dome having two chambers. A first chamber is attached to the tub and has two holes through which to exchange water with the tub. This first chamber is normally essentially full of water when the water level in the tub is above a predetermined minimum height and serves as a motion sensor with tub movement. The mass of water alternatively forces in and out of the tube which connects the first chamber to the second chamber. The second chamber is connected via a tube to an electronic pressure transducer and behaves as a normal air dome. The resulting waveform measured at the pressure transducer includes the water level information and tub motion information. Any other pressure signal, such as the agitator pressure and resulting varying water pressure due to splashing etc. has been practically eliminated by the double chamber air dome. That is, when the tub is held rigid during agitation, the signal has a nearly zero ripple.

The algorithm uses the motion data derived from the pressure transducer to derive the optimum water level. The peak to peak amplitude of the pressure signal represents the amplitude of axial rotation of the tub about the agitator shaft. This amplitude can be represented by X and varies with cloth to water density and the type of fabric. That is, X equals $F(V,M,F)$ where V is the water volume, M is the load weight and F is the fabric type. The value of X is greater for smaller water volumes and/or larger load sizes and in general rises to a maximum and then falls off as more water is added.

In the preferred embodiment the desired water volume is that which enables maximum rollover for a given load size. This correlates with water volumes slightly above the volume at which the peak motion occurs. A microcomputer can be programmed to search for this optimum point and to terminate fill.

DESCRIPTION OF THE PREFERRED EMBODIMENTS

Figure 1:
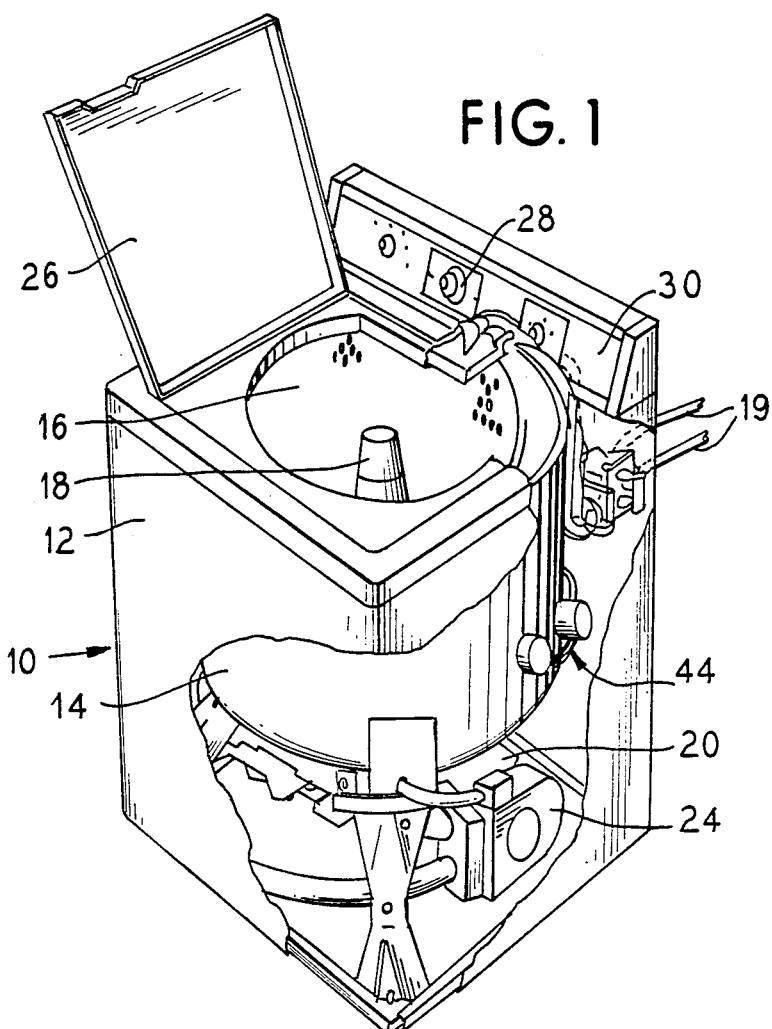
FIG. 1 illustrates an automatic washer embodying the principles of the present invention.

In FIG. 1, an automatic washing machine is shown generally at 10 comprising a cabinet or housing 12, and an imperforate tub 14, a concentrically mounted basket 16 with a vertical agitator 18, a water supply 19, an electrically driven motor 20 operably connected via a transmission to the agitator 18 and a pump 24 driven by the motor.

An openable lid 26 is provided on the cabinet top for access into the basket 16 and controls 28 including a presettable sequential control means for use in selectively operating the washing machine through a programmed sequence of washing, rinsing and spinning steps are provided on a console panel 30.

Figure 2:
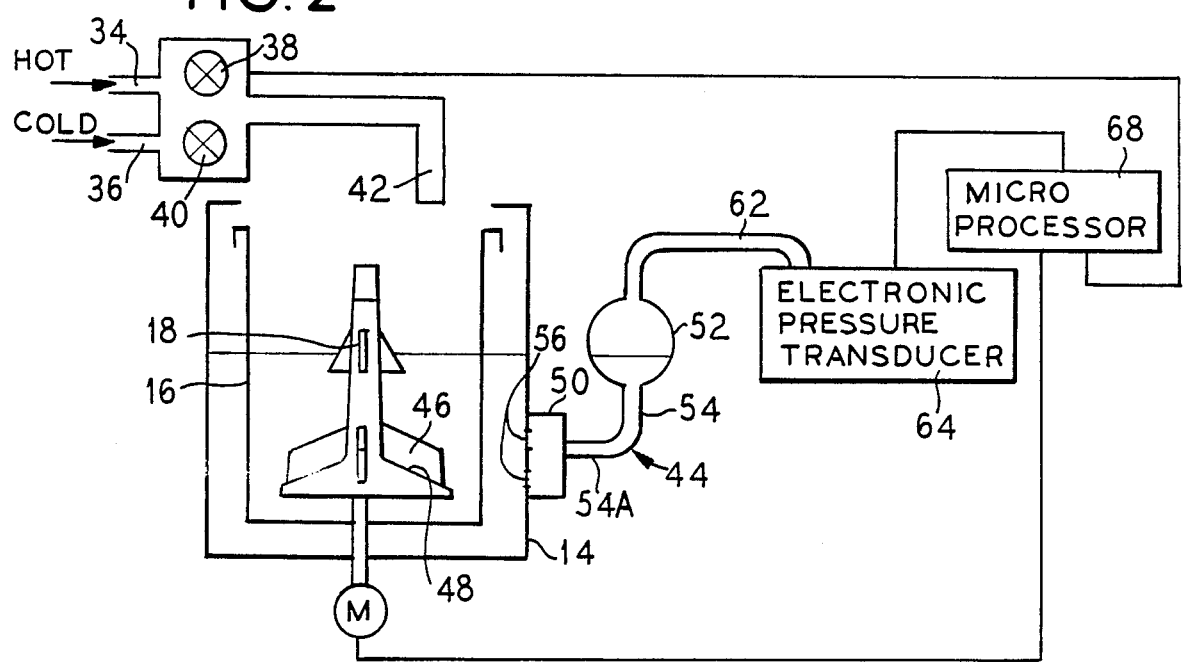
FIG. 2 is a schematic illustration of the automatic liquid level control of the present invention.

FIG. 2 is a schematic diagram showing a means for automatically filling the wash tub 14 to a desired level with wash liquid. There is a hot water supply 34 and a cold water supply 36 which direct water to pass through mixing valves 38 and 40 which may be operated automatically by the washer controls in response to a temperature parameter selected by the user when operating controls 28 and in response to a measured temperature of wash liquid.

During the filling operation water enters the tub through a nozzle 42 and the water level is monitored by a pressure sensor 44. Once the pressure sensor detects a water level corresponding to approximately 40 liters of water, the agitator 18 is caused to start an oscillation in which the agitator rotates about its vertical axis through a predetermined angle of, for example 120°, and then reverses its direction of travel to rotate in an opposite direction of the same angle.

The agitator 18 includes a plurality of radially extending vanes 46 which pump water outwardly during the oscillatory motion of the agitator, but which also carry the clothes load with the agitator and in effect couple the clothes load to the agitator. Thus, the clothes load within the wash basket 16 is moved in an oscillatory manner.

The clothes load provides a coupling of the agitator to the wash basket 16 and causes the wash basket 16 to also move in an oscillatory manner comprising partial rotation about the vertical axis of the agitator. During this stage of the wash cycle, the basket is held in a locked position relative to the wash tub 14 and thus the tub 14 moves with the basket.

As the water continues to fill the wash basket and tub, there is achieved a point at which the outward pumping of the water by the vanes 46 causes a rollover of the clothes load within the basket. This rollover is a movement of the clothes load radially outwardly along a lower skirt 48 of the agitator, upwardly along the basket wall 16, inwardly toward the agitator 18 and downwardly along the height of the agitator. It is known that increased rollover improves the washing performance and thus an optimum water level within the tub is one in which maximum rollover is achieved.

Applicants have determined that the maximum rollover rate of the clothes load can be determined by detecting the rotational movement of the wash tub. The wash tub movement is detected by using the pressure sensor 44 which is constructed in a novel manner.

Figure 3:
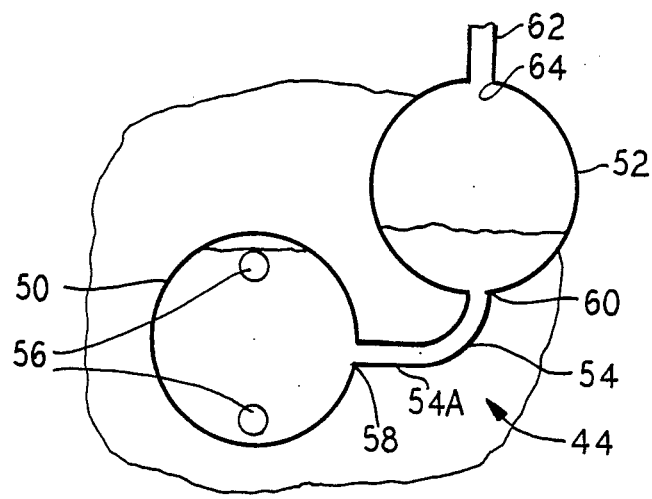
FIG. 3 is an enlarged view of the dual chamber air dome sensor.

As seen in FIGS. 1, 2 and 3, the pressure sensor 44 comprises two separate, but interconnected chambers 50, 52 which are connected by a conduit 54 which has a diameter smaller than the chambers 50, 52. The first chamber or reservoir 50 is mounted to the tub 14 and has two relatively small openings 56 which provide the liquid communication with the interior of the tub 14. The use of two separate vertically spaced openings 56, one near a bottom of the chamber and one near a top of the chamber, is done to let water completely fill the first chamber 50 at least to a level above a connection point 58 of the connecting conduit 54 and also to permit the chambers 50, 52 to completely drain at the end of a wash cycle. A single vertical slit opening would also provide the same function.

The connecting conduit 54 enters at a bottom point 60 of the second chamber 52 which is at an elevated position relative to the connecting conduit 54. Another conduit 62 connects at top opening 64 of the second chamber 52 and is connected to an electronic pneumatic pressure transducer 64 which provides as an output a square wave whose frequency is a function of pressure and sends a signal to a microprocessor 68. Alternatively, an analog to digital converter could be used if the output of the transducer is an analog signal.

As the water level within the tub 14 increases, the first chamber 50 will fill with water and water will pass through conduit 54 to partially fill the second chamber 52. Because air is trapped in the second chamber 52, as the water level in the tub increases, the trapped air within the second chamber 52 and conduit 62 will become increasingly pressurized and this is reflected by the signal sent from the pressure transducer 64 to the microprocessor 68. In the initial filling step of the washer, this pressure sensor 44 detects the water level in a static mode and is used to detect an initial or minimum fill of approximately 40 liters.

Once the initial fill amount has been achieved, the microprocessor 68 causes the motor 20 to be energized to oscillate the agitator 18 and, as mentioned above, the tub 14 also begins to oscillate. The connecting conduit 54 between the two chambers 50 and 52 has a horizontal component 54A which is mounted to the tub below the second chamber 52 and below the minimum fill level. As the tub rotates back and forth, the water in this conduit is caused to move back and forth relative to the conduit due to inertia, thereby causing an oscillating signal to be sent from the pressure transducer 64 to the microprocessor.

Figure 4:
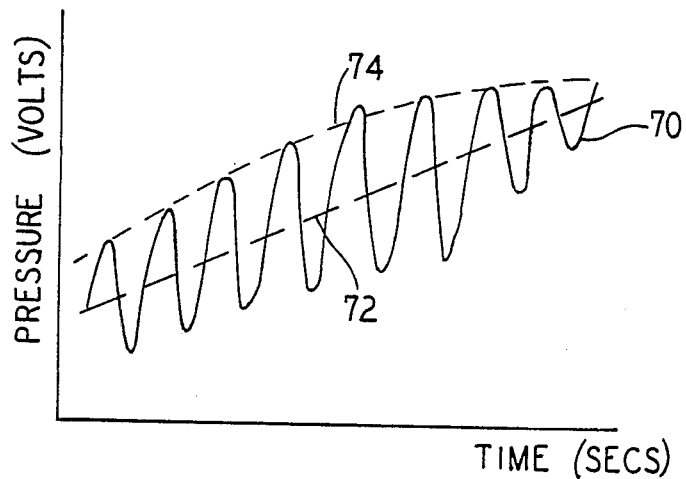
FIG. 4 is a graphic illustration of the wave form measured at the electronic pressure transducer.

FIG. 4 illustrates the oscillating signal of the pressure transducer 64. The oscillating continuous line 70 represents the amplitude of the oscillating motion of the tub as a predetermined additional amount of water is added to the interior of the tub. A central dashed line 72 represents the actual water level within the tub and a dotted line or curve 74 connecting the peak oscillation points of line 70 permits a determination of the optimum water level.

Figure 5:
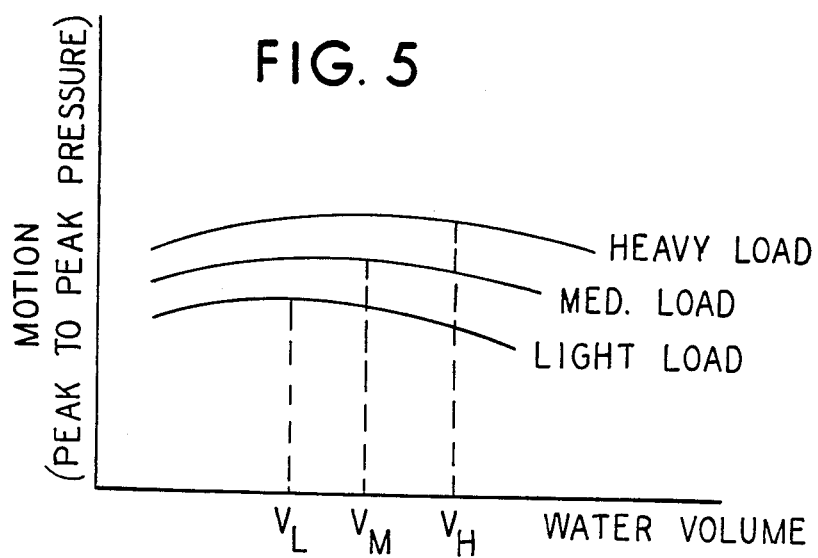
FIG. 5 is a graphic illustration of the relationship between motion and water volume for various load sizes.

It has been determined that for at least some wash speeds, as the water level increases and the clothes begin their rollover, the coupling between the agitator and basket is reduced thereby resulting in less oscillatory motion of the basket and tub. The peak to peak curve is illustrated in FIG. 5 for varying sized loads and it is seen that the degree of coupling and thus motion increases as water volume increases up to a certain point for each size load and then decreases after the maximum point. Applicants have determined that the optimum water volume for a given sized load is that water volume which is slightly greater than the water volume which results in maximum tub motion. Addition of water beyond this optimum value does not appreciably increase the number of rollovers in a given time period (and may decrease the number for small loads) and therefore this extra water is not necessary.

During the addition of water after the initial fill agitation continues and the microprocessor 68 stores and compares successive peaks of the oscillating signal 70 to determined the slope of the peak to peak curve 74 which represents the relative changes in amplitude of the tub rotation. During this sampling period the size of the load can be determined with some degree of accuracy in that loads of different sizes have distinctly different curves as is illustrated in FIG. 5. For example, a light load of approximately three pounds reaches a peak with a water volume substantially less than that required to produce a peak motion with a medium load of about six pounds. The medium load in turn has a peak motion at a lesser water volume than that of a heavy load which would be in the range of nine to twelve pounds.

Thus, with a light load situation, the sampling during the additional filling step would detect a slope change from positive to negative indicating that an optimum water volume had been achieved with a relatively small addition, for example 10 liters. The water fill would be terminated and the wash cycle would continue with agitation at that water level. Sensing and comparison of the relative tub motion would continue for some preselected period of time so that in the event the user added clothes to the load during the initial stages of the wash cycle, this could be detected and additional water added if needed.

Based upon the slope of the curve 74, it may be determined that a medium load is present in the wash tub. If this is the case, then agitation of the wash load is terminated and additional water is added of a predetermined amount, for example on the order of ten liters, based on an average level change. At about the time when approximately five liters of water remain to be added to the tub, agitation is restarted and the peak to peak pressure curve 74 is again sampled to determine the slope of the curve. If a slope change from positive to negative is detected, then water fill is terminated and the wash cycle continues. If the sensed slope indicates that additional water is required the same agitation termination and fill continuation steps are repeated and again the peak to peak pressure curve is sensed during the final portion of the additional filling step.

If, during the initial additional filling step the slope of the curve indicates that a heavy load is present in the tub, then a predetermined water volume, on the order of twenty liters, will be added to the tub while the agitation is terminated. Again, during the final portion of such filling, agitation is resumed and sampling of the pressure curve 74 is continued for determination of the slope as described above.

Since the center line 72 of the oscillating curve 70 indicates actual water volume in the tub, the single pressure sensor is used to monitor levels and additions during fill and as a maximum water level sensor to terminate water fill at a predetermined maximum level regardless of the slope of the pressure curve to prevent flooding.

It has been determined that by using a dual chamber pressure sensor and a necked down entrance to the connecting conduit 54, agitator motion can be effectively filtered out of the pressure sensor reading so that the resulting signal is primarily tub motion.

Thus, the present invention provides for an automatic water level control in which a single sensor can be utilized to determine water levels, (including minimum and maximum) and tub motion and, the information obtained from the sensor can be utilized to admit an optimum volume of water to the tub while reducing agitation of the load at a less than optimum water volume and to terminate the water fill operation once the optimum water level has been achieved.

The present invention does not rely on absolute motion values or torque values which are dependent on machine characteristics, that is characteristics of different models or characteristics of differences between machines due to varying tolerances, but rather the motion sensor detects relative changes in motion within the subject machine. Agitation speed changes are compensated for automatically and varying sized loads are treated differently rather than attempting to utilize an identical motion level or amplitude for every size load. That is, referring to FIG. 5, the motion of the tub with a heavy load at an optimum water volume $V_H$ is much greater than the motion of the tub with a light load at its optimum water volume $V_L$. Prior devices world require the relative motion for the heavy load to be reduced to the amount of motion for the light load thus resulting in too much water for large loads or too little water for small loads.

The determined size of the load can be stored during the current wash cycle to permit appropriate amounts of water to be admitted for subsequent rinsing steps to reduce excessive water usage and to optimize rinse effectiveness.

It will be apparent to those skilled in the art that wash characteristics may vary from machine to machine and from speed to speed. While the foregoing exemplary embodiment describes a specific algorithm for determining the optimum water level for a wash load, it is within the contemplation of the invention that the apparatus of the present invention may be used to measure characteristics and use algorithms other than that disclosed, which may be determined to be more appropriate for some purposes.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. An automatic washing machine having a tub to receive washing liquid and a load of clothes to be washed therein including a vertical axis agitator and an automatic liquid fill control system comprising:

supply means for supplying washing liquid to said tub;

means for determining when an initial liquid depth has been achieved in said tub;

means for oscillating said agitator when said initial liquid depth has been attained;

means for sensing rotational movement of said tube caused by oscillation of said agitator;

means for determining when a predetermined change in successive amplitudes of rotational movement of said tub has occurred; and means for terminating the supply of liquid to said tub after determination of said predetermined change in successive amplitudes of rotational movement of said tub.

2. An automatic washing machine having a tub receive washing liquid and a load of clothes to be washed therein including a vertical axis agitator and an automatic liquid fill control system comprising:

supply means for supplying washing liquid to said tub;

means for determining when an initial liquid depth has been achieved in said tub;

means for oscillating said agitator when said initial liquid depth has been attained;

means for sensing rotational movement of said tub caused by oscillation of said agitator;

means for determining when a predetermined characteristic of rotational movement of said tub has occurred; and means for terminating the supply of liquid to said tub after determination of said predetermined characteristic of rotational movement of said tub; said means for determining an initial liquid depth and said means for sensing rotational movement comprise a single pneumatic pressure sensor.

3. An automatic washing machine according to claim 2, wherein said single pneumatic pressure sensor further comprises a maximum liquid level sensor.

4. An automatic washing machine according to claim 1, wherein said predetermined change in successive amplitudes indicates that rotational movement of said tub is the maximum rotational movement thereof.

5. An automatic washing machine having a tub to receive washing liquid and a load of clothes to be washed therein including a vertical axis agitator and an automatic liquid fill control system comprising:

a pneumatic sensor comprising a conduit having one end exposed to the interior of said tub and an opposite end coupled to a pressure transducer, a portion of said conduit being disposed relatively horizontally on said tub below a preselected minimum water level, such that wash liquid will fill said horizontal portion and will move horizontally relative to said horizontal portion in response to oscillatory movement of said tub about said vertical axis; and a control means for detecting said horizontal movement of said wash liquid in said conduit and controlling a supply of wash liquid directed into said tub in response to a predetermined characteristic of said movement.

6. An automatic washing machine according to claim 5, wherein said conduit is diametrically enlarged between said horizontal portion and said exposed end, and said exposed end has an opening area smaller than said enlarged conduit diameter.

7. An automatic washing machine according to claim 6, wherein said opening area includes an open area near a top of said enlarged diameter and an open area near a bottom of said enlarged diameter.

8. An automatic washing machine according to claim 7, wherein said opening area comprises two vertically spaced openings.

9. An automatic washing machine having a tub to receive washing liquid and a load of clothes to be washed therein including a vertical axis agitator and an automatic liquid fill control system comprising:

means for continuously sensing the amplitude of rotational movement of said tub;

means for comparing successive amplitudes to determine whether said amplitudes are increasing or decreasing; and means for controlling a supply of wash liquid directed into said tub in response to a predetermined characteristic of said comparison of successive amplitudes.

10. An automatic washing machine according to claim 9, wherein said continuously sensing means comprises a pneumatic pressure sensor.

11. An automatic washing machine according to claim 10, wherein said means for comparing includes a microprocessor.

12. An automatic washing machine according to claim 10, wherein said means for comparing includes a pressure transducer operably connected to said pneumatic pressure sensor and to a microprocessor.

13. An automatic washing machine having a tub to receive washing liquid and a load of clothes to be washed therein including a vertical axis agitator and an automatic liquid fill control system comprising:

a single sensor to detect a minimum water level in said tub, a maximum water level in said tub and tub movement about said vertical axis; and means for controlling a supply of wash liquid directed into said tub in response to a predetermined characteristic of sensed tub movement.

14. An automatic washing machine according to claim 13, wherein said single sensor comprises a pneumatic pressure sensor connected by a conduit to said tub interior, a portion of said conduit being disposed horizontally below a predetermined minimum water level.

15. An automatic washing machine according to claim 14, wherein said conduit has an enlarged reservoir portion between said horizontal portion and said tub and a relatively small communicating area between said reservoir and said tub interior.

16. An automatic washing machine according to claim 15, wherein said communicating area from said reservoir into said tub interior is arranged so as to completely drain said reservoir and conduit at the end of each wash cycle.

17. An automatic washing machine having a tub to receive washing liquid and a load of clothes to be washed therein including a vertical axis agitator and an automatic liquid fill control system comprising:

means for sensing relative changes in amplitude of tub movement during a fill and agitate step, and means for terminating the filling operation upon sensing a predetermined relative change.

18. An automatic washing machine according to claim 17, wherein said sensing means comprises:

a horizontally disposed conduit for receiving a liquid secured to said tub to oscillate with said tub;

an air chamber in communication with said conduit, said air chamber being mounted at an elevated position relative to said conduit;

a pneumatic pressure sensor in communication with said air chamber;

means for storing successive maximum sensed pressures; and means for comparing successive sensed pressures;

whereby oscillation of said conduit will cause a relative motion between said conduit and said liquid, thus varying the pressure chamber which is detected by said pneumatic pressure sensor, stored by said storing means and compared by said comparing means.

* * * * *